(12) United States Patent
Arthur et al.

(10) Patent No.: US 11,969,814 B2
(45) Date of Patent: Apr. 30, 2024

(54) SYSTEMS AND METHODS FOR AUTOMATED TIP TRANSFER

(71) Applicant: TOYOTA MOTOR ENGINEERING & MANUFACTURING NORTH AMERICA, INC., Plano, TX (US)

(72) Inventors: John D. Arthur, Georgetown, KY (US); Terry A. Lee, Shelbyville, KY (US); James D. Womack, Lexington, KY (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 146 days.

(21) Appl. No.: 17/406,799

(22) Filed: Aug. 19, 2021

(65) Prior Publication Data
US 2023/0058902 A1 Feb. 23, 2023

(51) Int. Cl.
*B23K 11/30* (2006.01)
*B23K 11/31* (2006.01)

(52) U.S. Cl.
CPC .......... *B23K 11/3072* (2013.01); *B23K 11/31* (2013.01)

(58) Field of Classification Search
CPC ... B23K 11/3072; B23K 11/31; B23K 11/115; B23K 11/253; B23K 11/3063; B23K 11/314
USPC ...................................................... 219/86.33
See application file for complete search history.

(56) References Cited

U.S. PATENT DOCUMENTS

| 4,794,221 A * | 12/1988 | Takabe | B23K 11/3072 |
| | | | 219/86.25 |
| 5,495,663 A * | 3/1996 | Saito | B23K 11/3072 |
| | | | 29/253 |
| 2015/0020382 A1* | 1/2015 | Lee | B23P 6/00 |
| | | | 29/729 |

FOREIGN PATENT DOCUMENTS

| JP | 05285654 A | 11/1993 |
| JP | 2896524 B2 | 5/1999 |
| JP | 2000102873 A | 4/2000 |
| JP | 2002307170 A | 10/2002 |
| JP | 5008132 B2 | 8/2012 |

* cited by examiner

*Primary Examiner* — Dana Ross
*Assistant Examiner* — James F Sims, III
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems and methods are provided for exchanging electrode tips, e.g., electrode tips used in resistance spot welding, and disposing of used/unusable electrode tips. Used/unusable electrode tips may be collected, e.g., while within an assembly line. Such used/unusable electrode tips may be routed to a receptacle(s) reside outside the assembly line. Accordingly, disposing or removing of the used/unusable electrode tips can be accomplished without stopping the assembly line, and decreasing any chance for safety events.

12 Claims, 5 Drawing Sheets

SYSTEMS AND METHODS FOR AUTOMATED TIP TRANSFER

TECHNICAL FIELD

The present disclosure relates generally to robotic welding devices, and more particularly, to automated tip transfer systems and methods that delivers used/unusable welding electrode tips outside an automated assembly line.

DESCRIPTION OF RELATED ART

Welding of materials can be performed in some environments, such as automated lines, assembly lines, and the like. For example, resistance spot welding can be used to join metal plate materials, where an electrode having an electrode tip can be used to destroy oxidation film present on a surface of each of the metal plate materials (especially aluminum alloy plate materials).

In particular, an electrode tip may comprise a plurality of projections that, for example, may assume the shape of a quadrangular pyramid provided in a lattice arrangement. These projections can be used to destroy the oxidation film at the time of resistance spot welding (when the metal plate materials are held by a pair electrodes to which the electrode tips are respectively attached). Moreover, current can be kept from being concentrated on a portion each of the metal plate materials (current can be kept from concentrating on a weak region of the oxidation film in a state where the oxidation film is not destroyed). Accordingly, the temperature generated by the resistance spot welding can be kept at a desired level, and the electrode tip is prevented from melting and adhering to one or more of the metal plate materials.

BRIEF SUMMARY OF THE DISCLOSURE

In accordance with one embodiment, a system may comprise a first receptacle adapted to receive a welding electrode tip for disposal, the first receptacle being located within a restricted area. The system may further comprise a second receptacle operatively connected to the first receptacle adapted to receive the welding electrode tip from the first receptacle, the second receptable being located external to the restricted area.

In some embodiments, the first receptacle comprises an input chamber adapted to receive the welding electrode tip from an automated electrode tip changing unit adapted to remove and dispose of the welding electrode tip in the input chamber.

In some embodiments, the first receptacle comprises an output chamber adapted to receive the welding electrode tip from the input chamber.

In some embodiments, the second receptacle and the first receptacle are operatively connected via a hose through which a propellant moves the welding electrode tip from the output chamber of the first receptacle to the second receptacle.

In some embodiments, the propellant comprises a compressed or pressurized gas.

In some embodiments, the automated electrode tip changing unit is operatively connected to a welding assembly from which the welding electrode tip is received.

In some embodiments, the input chamber comprises a funneled receptacle.

In some embodiments, the second receptacle comprises a removable container adapted to capture the welding electrode tip.

In some embodiments, the restricted area comprises an area of operation of an automated manufacturing line.

In some embodiments, the second receptacle comprises an area outside a boundary of the area of operation of the automated manufacturing line.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
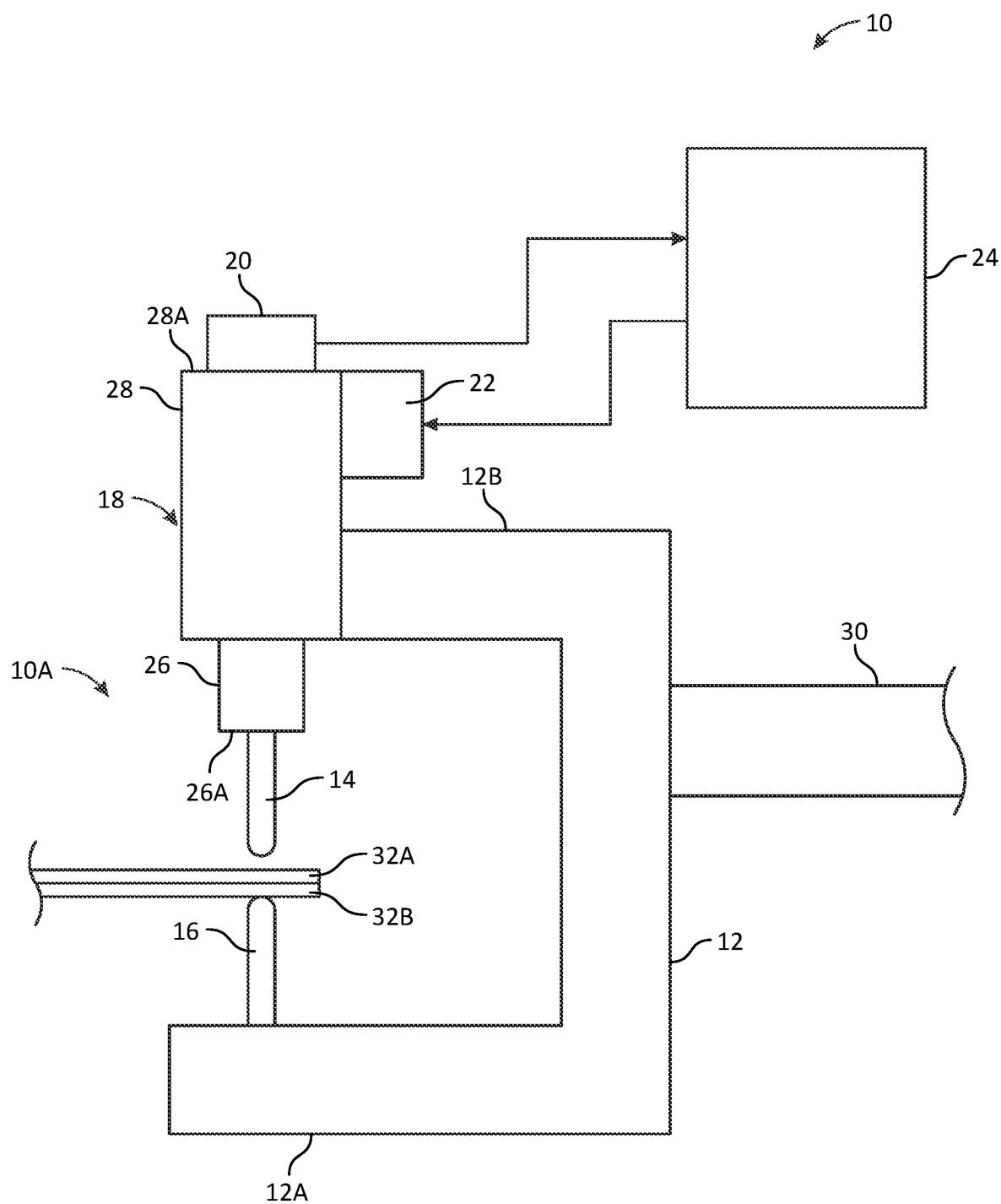
FIG. 1 illustrates an example welding device with which various embodiments may be operatively connected.

The figures are not exhaustive and do not limit the present disclosure to the precise form disclosed.

DETAILED DESCRIPTION

As noted above, certain automated (manufacturing) lines, assembly lines, or similar environments may include robotic or automated welding devices that use electrode tips. Over time, through use, such electrode tips can become unusable due to, e.g., deformation of the electrode tip that can result in undesirable arc quality, buildup of carbon residue that may prevent proper welds, etc. In other instances, an electrode tip may simply not meet requisite standards. Accordingly, when an electrode tip is unusable for any reason, that electrode tip is discarded or transferred/changed out.

To effectuate this transferring or changing out of electrode tips, welding electrode tip changing units/devices can be used to remove electrode tips from their respective electrodes so that the electrode tips can be discarded. Typically, such electrode tip changing units remove an electrode tip, and subsequently drop or deposit the electrode tip into a collection bin or other receptacle. The collection bin or receptacle usually resides underneath the electrode changing unit.

In some automated lines, production/use of the automated line (or devices therein) must be stopped to allow a human actor to physically remove the collection bin or remove the electrode tips from the collection bin. Stopping the automated line or device(s) therein results in downtime, and necessitates involvement of a human actor (or other collection device, robot, mechanism, etc.), all of which can negatively impact production on that automated line.

Accordingly, various embodiments are directed to systems and methods of automating tip transfers/changes, whereby the discarded electrode tips are deposited outside the boundary/perimeter of the automated line. In this way, the automated line need not be stopped, nor will a human actor or other collection device/mechanism be required to enter the automated line. With respect to the human action, safety risks resulting from entry into the automated line can be negated or mitigated.

In particular, an electrode tip changing unit operatively connected to a welding device may deposit an electrode tip extracted from an electrode of the welding device into an inside automated line (IAL) receptacle. The receptacle may comprise a (first) input chamber, such as a tray or funnel device, and a (second) output chamber, such as a receiver compartment. The input and output chambers may be operatively connected via a hose or other connecting mechanism, where forced/compressed air can be used to propel or move the electrode tips from the input chamber to the output chamber. The electrode tips can be collected in a receptacle or compartment (connected to another end of the hose) residing outside of the automated line. That outside automated line (OAL) receptacle may comprise, in part, a removable cup or collection unit that can be removed by a human actor or other device to be ultimately discarded, again outside of the automated line and without a need to stop the automated line.

Before describing the details of various embodiments, it would be helpful to describe operation of a welding assembly with which embodiments may be utilized. FIG. 1 illustrates an example welding assembly 10 that can include a welding device/gun 10A in which electrodes 14 and 16 are used, and an electrode tip changing unit (not shown in FIG. 1).

It should be understood that although not shown welding assembly 10 may further include a control system for controlling/actuating various components or aspects of the welding assembly 10. For example, the control system may include components or mechanisms for raising/lowering electrodes 14 and 16, positioning electrodes 14 and 16, calculation units to determine current positions, movement needed to reach another position, components for setting the force to be applied to metal plate materials, etc.

Welding device 10A may include a main body 12 that is retained by a robot arm 30, an upper electrode 14, a lower electrode 16 that is positioned in/at a lower portion 12A of the main body 12. Welding device 10A may further comprise an electrically-operated upper electrode raising/lowering device (hereinafter referred to simply as an electrode raising/lowering device) 18 that retains and raises/lowers the upper electrode 14, an electrode position detection device 20, and a current adjustment device 6 that adjusts a value of welding current caused to flow between the upper electrode 14 and the lower electrode 16 (which may be referred to hereinafter simply as a current value). Metal plates 32A and 32B to be welded may be, for example, aluminum alloy plate materials.

As shown in FIG. 1, main body 12 is a substantially U-shaped member, and the lower electrode 16 is removably attached to an upper surface of the lower portion 12A of main body 12. Electrode raising/lowering device 18 may be mounted to upper portion 12B of main body 12.

The electrode raising/lowering device 18 is equipped with a servomotor 28 that is mounted to a section of the upper portion 12B of main body 12, and a raising/lowering member 26 that is linked with a drive shaft (not shown) of this servomotor 28. The upper electrode 14 may be removably mounted to a lower end portion 26a of this raising/lowering member 26.

The electrode position detection device 20 is configured as, for example, an encoder, and is mounted at an upper end portion 28A of the servomotor 28. Moreover, a detection value of the electrode position detection device 20 can be transmitted to the control device 24.

The current adjustment device 22 adjusts a value of current caused to flow between the upper electrode 14 and the lower electrode 16, in accordance with a current command value that is transmitted from the control device 24. Current adjustment device 22 may be embodied, for example, as a device that is equipped with a variable resistor, a converter, or the like.

As alluded to above, although not shown, it should be understood that a control system or device may be used to control operation of welding assembly 10, and may include: an input unit that acquires information regarding, e.g., thicknesses of the metal plates 32A and 32B; an electrode position calculation unit that calculates the position of an electrode position from an electrode position detection device; a current value calculation unit that calculates a current value in carrying out energization between the upper electrode 14 and the lower electrode 16; a pressurizing force setting unit that sets a pressurizing force needed for welding (a pressurizing force applied to the metal plate 32A and 32B by the upper electrode 14 and the lower electrode 16; and an output unit that outputs information regarding the current value calculated by the current value calculation unit, and information regarding the pressurizing force set by the pressurizing force setting unit.

The control system may comprise at least a processor, and a memory in which one or more programs or instructions for effectuating control of welding assembly 10, etc. are stored and executed by the processor. In particular, the control system can be realized by storing a program corresponding to a relevant function into a ROM, in a unit that is mainly composed of a CPU and that is equipped with the ROM, a RAM, an input/output interface, and the like. Sensed values, calculations, determinations, etc. from various input devices, calculation units, etc. can temporarily be stored in RAM. Those of ordinary skill in the art would understood how to implement a control system for controlling operation of welding assembly 10.

Figure 2A:
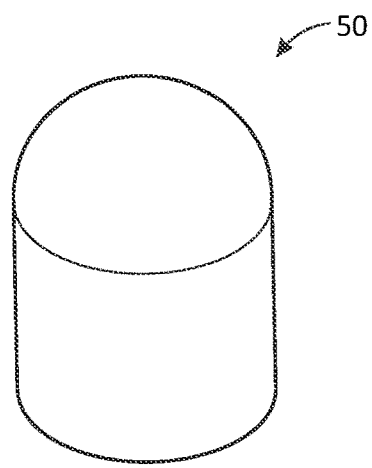
FIG. 2A is a perspective view of an example of a useable welding electrode tip.
Figure 2B:
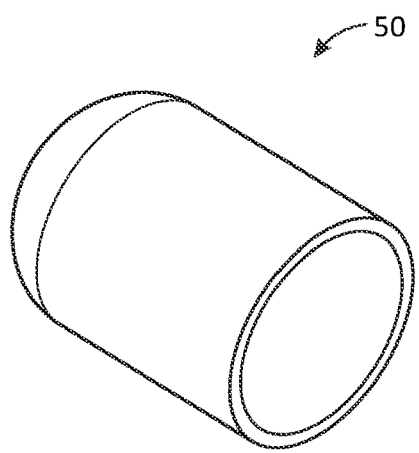
FIG. 2B is another perspective view of the example usable welding electrode tip of FIG. 2A.
Figure 2C:
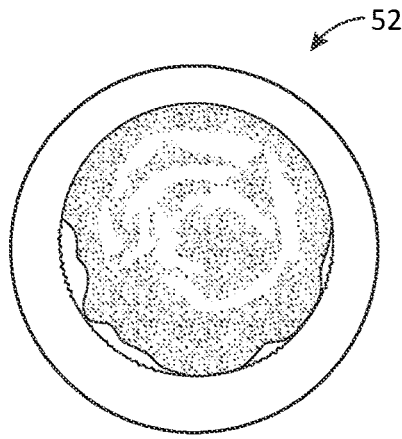
FIG. 2C is a top view of an example of an unusable welding electrode tip.

FIG. 2A illustrates a first perspective view of an example of a electrode tip 50 that is suitable for use in welding applications, such as resistance spot welding. An electrode tip, such as electrode tip 50 may be placed in such a way that it covers respective ends of electrodes 14 and 16 meant to contact metal pates 32A and 32B so to effectuate welding of the metal pates 32A and 32B. As illustrated in FIG. 2B, a second perspective view of electrode tip 50, electrode tip 50 may have a cavity/space in which an end of an electrode, e.g., electrode 14 or 16 may engage. It can be appreciated that electrode tip 50 is not deformed, and has the proper tip shape (for a particular application). It should be understood that the electrode tip 50 can have different shapes (more acute or more obtuse) depending, for example, on the material of metal plates 32A/32B being welded together, or the type/strength of weld desired, etc. FIG. 2C illustrates and example of an unusable electrode tip 52. Electrode tip 52 can be appreciated as being blunted/deformed or holding some residue in a way that may negatively impact the welding process. Accordingly, electrode tip 52 would need to be replaced, i.e., removed by electrode tip changing unit 10B, to be replaced by a new/usable electrode tip. It should be understood that electrode tips may comprise a variety of materials/combinations of materials, e.g., copper, aluminum, chromium, or zirconium. It should be understood that this particular makeup is merely an example, and not intended to be limiting in any way.

Figure 3:
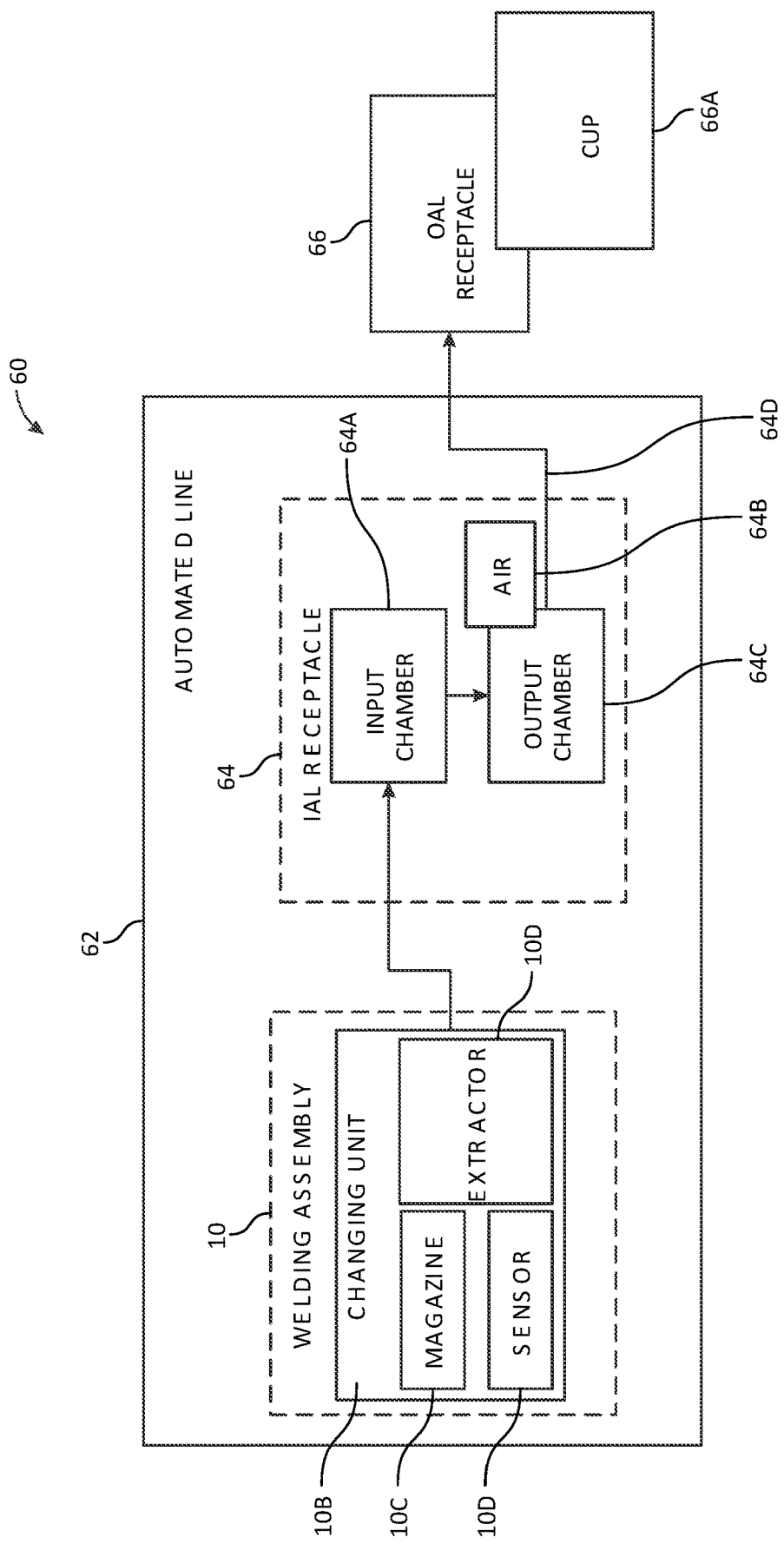
FIG. 3 is a schematic representation of system for automated tip transfer in accordance with one embodiment.

FIG. 3 is a schematic representation of an automated electrode tip transfer or change system 60 and associated workflow. As illustrated in FIG. 3, welding assembly 10 may include an electrode tip changing unit 10B. Examples of known electrode tip changing units are manufactured by Obara Corp. and Kyokuto Co., Ltd., and are generally embodied as robotic or electro-mechanical machines capable of removing an electrode tip from welding device 10A. Generally, any known tip changing/transfer unit may be used to effectuate tip transfer of unusable electrode tips and usable electrode tips. In one embodiment illustrated in FIG. 3, electrode tip changing unit 10B may comprise a magazine 10C, a sensor(s) 10D, and an extractor 10D. Magazine 10C may hold one or more usable (e.g., new/unused) electrode tips, while sensor(s) 10D may be adapted to detect the presence/absence of an electrode tip on an electrode. Extractor 10D can be used to remove an electrode tip, such a used/unusable electrode tip from one or more electrodes. In operation, when warranted, extractor 10D may remove, e.g., an electrode tip from electrode 14 (FIG. 1). Upon sensor(s) 10D sensing that electrode 14 has no electrode tip, electrode tip changing unit 10B may operate to position electrode 14 by/at magazine 10C to obtain and install a new electrode tip on electrode 14.

Electrode tip changing unit 10B may deposit a used or unusable electrode tip into an IAL receptacle 64. Following the above example, extractor 10D may deposit (place or let fall) an unusable electrode tip in IAL receptacle 64. In one embodiment, IAL receptable 64 may comprise an input chamber 64A, an air unit 64B, and an output chamber 64C.

In some embodiments, input chamber 64A may be a tray or funnel into which used/unusable electrode tips may be deposited by electrode tip changing unit 10B. The used/unusable electrode tips may be funneled or routed to an output chamber 64C. Air unit 64B may comprise a hose 64D (or similar component, such as piping or the like), through which forced/compressed air or (or other gas or liquid) can be passed to propel electrode tips collected in input chamber 64A to output chamber 64C. Air unit 64B may further comprise a blower, fan, compressor, etc. to generate the forced/compressed air propelled through hose 64D.

Hose 64D may be connected to OAL receptacle 64 which receives the used/unusable electrode tips from output chamber 64C. Electrode tips can be collected in OAL receptacle 66, which can be a container of any type suitable to receive the electrode tips via hose 64D. It should be understood that use of hose 64D is to route the used/unusable electrode tips to a location outside the perimeter of the automated line 62, which can be some defined boundary/boundaries within which the automated line 62's equipment, machinery, etc. are located. OAL receptacle 66 may comprise a removable cup 66A (or similar container) in which used/unusable electrode tips ultimately rest. A user/human actor/other mechanism(s) may separate removable cup 66A from OAL receptacle 66 so that the used/unusable electrode tips can be discarded or processed in the desired manner.

FIGS. 4A-4D illustrate an example implementation of automated electrode tip transfer or change system 60. In this example, a funnel 74A (which may be an embodiment of input chamber 64A receives unusable/discarded electrode tips from extractor 70D (which may be an embodiment of extractor 10D)). Although illustrated as being below/under extractor 10D, such placement is not required. Other methods/mechanisms may be used to effectuate receipt of unusable electrode tips for discarding.

An air unit (not shown in FIGS. 4A-4D) may be used to propel unusable electrode tips collected via input chamber 74A and deposited into output chamber 74C through a hose 74D (an embodiment of hose 64D). It should be understood that other mechanisms, methods of routing or forcing unusable/collected electrode tips from the output chamber 74C to an OAL region, may be used. For example, other types of hosing may be used, instead of hosing, some other form of piping, or connective component(s) through which electrode tips can be routed are contemplated.

Figure 4A:
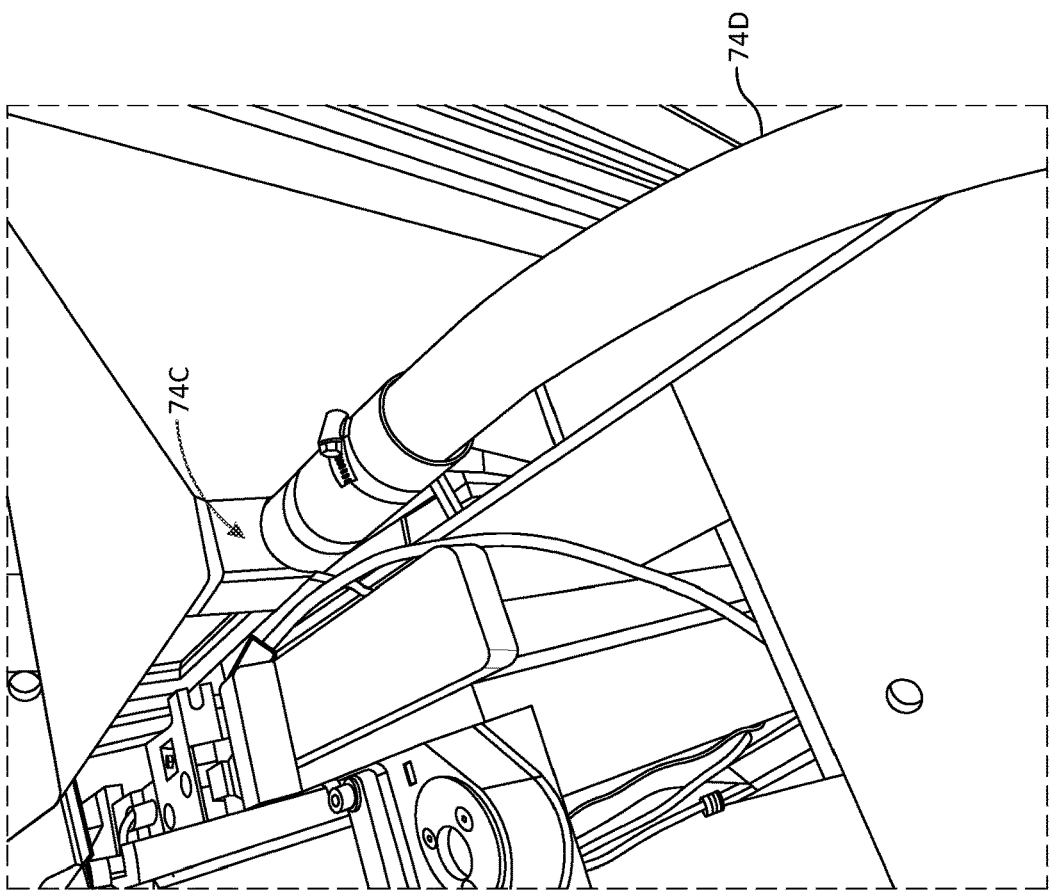
FIGS. 4A-4D illustrate an example implementation of the system of FIG. 3.
Figure 4B:
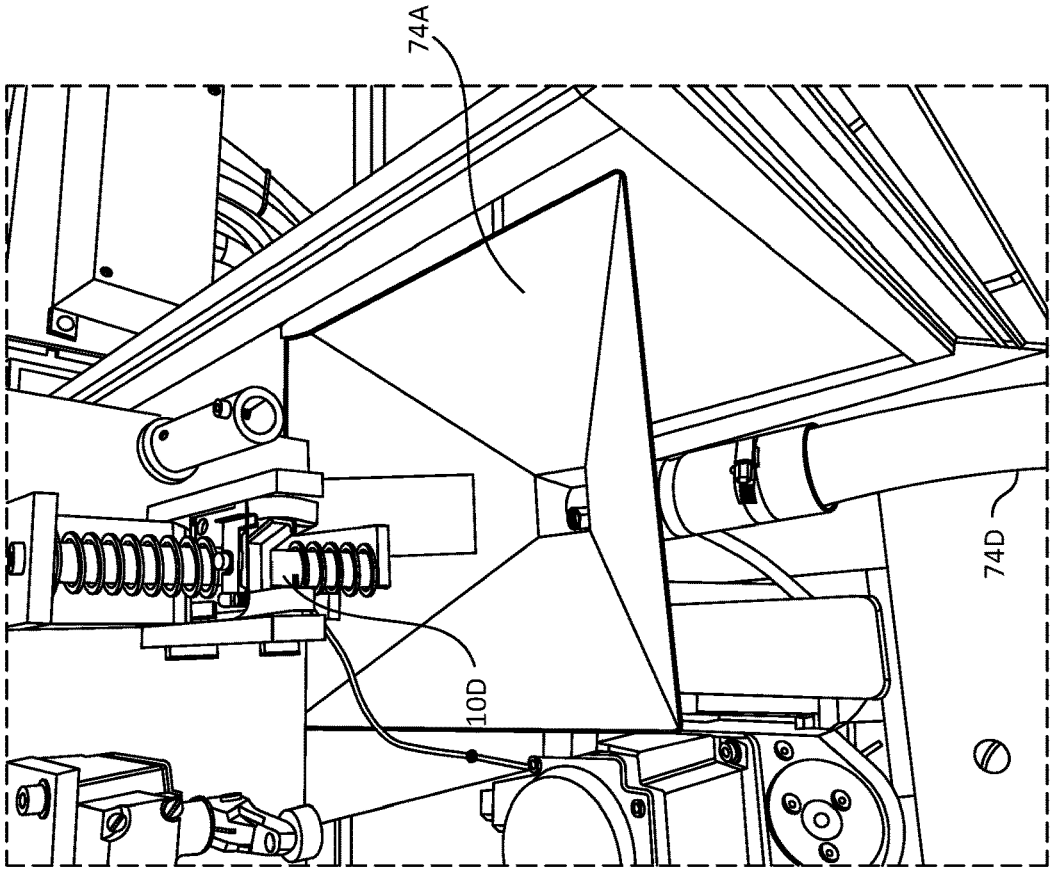
Figure 4D:
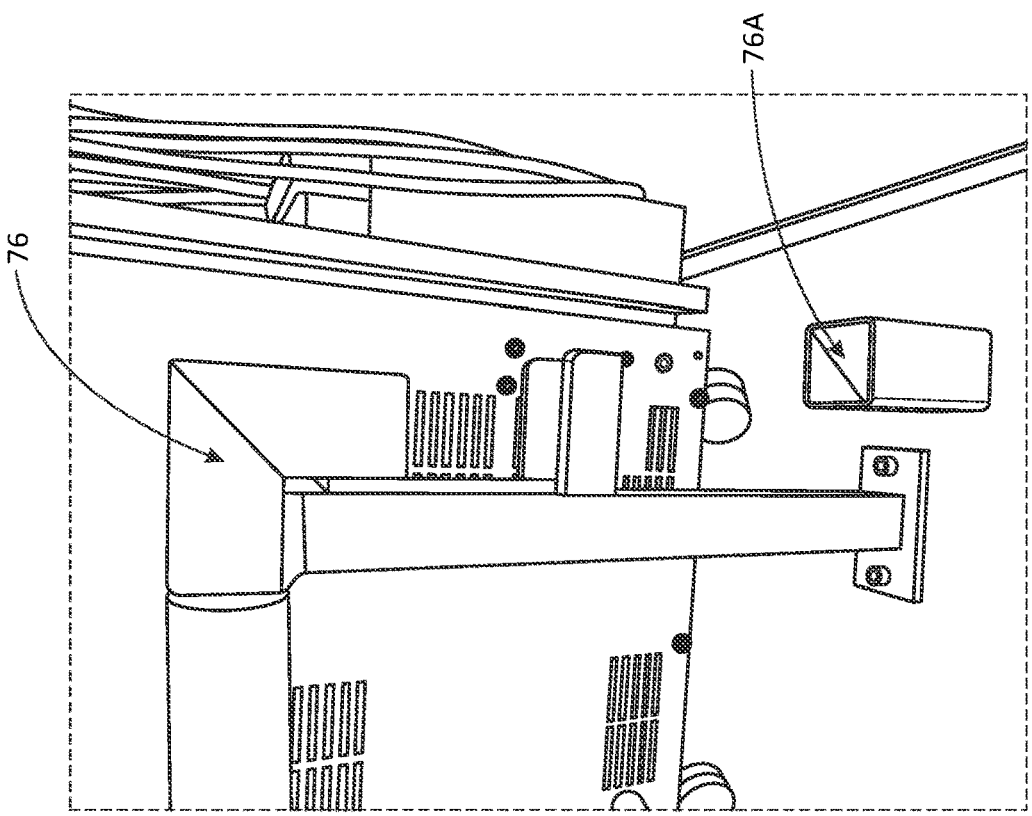
Figure 4C:
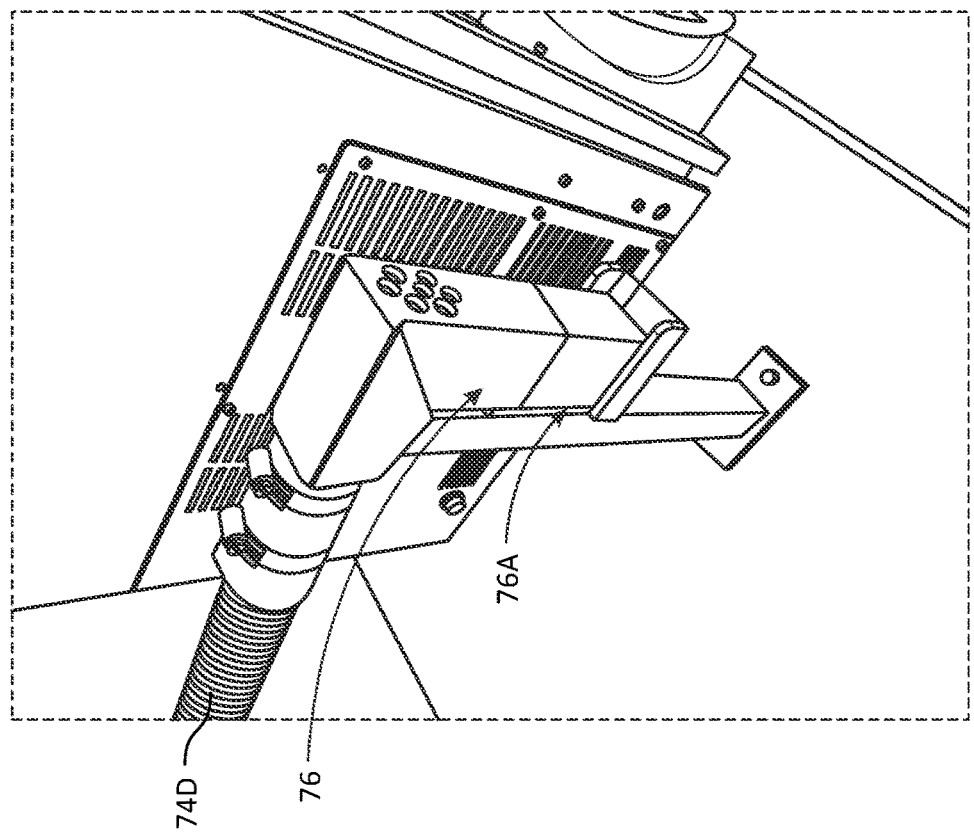

At another end of hose 74D, distal from the end operatively connected to output chamber 74C, is OAL receptable 76, which can be any appropriate container/receptacle for receiving electrode tips. In the illustrated embodiment OAL receptacle 76 may comprise, or may be operatively connected to a removable cup 76A in which the electrode tips accumulate. Again, the shape, type of "cup" or receptacle, size, etc. of removable cup 76A can vary. As illustrated in FIG. 4D, when removed, the contents of removable cup 76A can appropriately discarded, used for another purpose(s), etc.

Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common s elements. Such a description shall not require or imply that separate components are used to implement such features or functionality.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising: a first receptacle adapted to receive a welding electrode tip for disposal, from an electrode tip changing unit; and a second receptacle adapted to receive the welding electrode tip from the first receptacle, wherein the second receptacle and the first receptacle are operatively connected via a connecting mechanism, the connecting mechanism comprises a route through which a propellant moves the welding electrode tip from the first receptacle to the second receptacle.

2. The system of claim 1, wherein the first receptacle comprises an input chamber adapted to receive the welding electrode tip from an automated electrode tip changing unit adapted to remove and dispose of the welding electrode tip in the input chamber.

3. The system of claim 2, wherein the first receptacle comprises an output chamber adapted to receive the welding electrode tip from the input chamber.

4. The system of claim 2, wherein the automated welding electrode tip changing unit is operatively connected to a welding assembly from which the welding electrode tip is received.

5. The system of claim 2, wherein the input chamber comprises a funneled receptacle.

6. The system of claim 1, wherein the second receptacle comprises a removable container adapted to capture the welding electrode tip.

7. The system of claim 1, wherein the electrode tip changing unit is part of an automated manufacturing line.

8. The system of claim 1, wherein the first receptacle comprises an input chamber adapted to receive the welding electrode tip from an automated electrode tip changing unit adapted to remove and dispose of the welding electrode tip in the input chamber.

9. A system, comprising: a first receptacle adapted to receive a welding electrode tip for disposal, wherein the first receptacle comprises an input chamber adapted to receive the welding electrode tip from an automated electrode tip changing unit adapted to remove and dispose of the welding electrode tip in the input chamber, and an output chamber adapted to receive the welding electrode tip from the input chamber; and a second receptacle operatively connected to the first receptacle and adapted to receive the welding electrode tip from the first receptacle, wherein the second receptacle and the first receptacle are operatively connected via a hose through which a propellant moves the welding electrode tip from the output chamber of the first receptacle to the second receptacle.

10. The system of claim 9, wherein the propellant comprises a compressed or pressurized gas.

11. The system of claim 8, wherein the first receptacle comprises an output chamber adapted to receive the welding electrode tip from the input chamber, and wherein the propellant moves the welding electrode tip from the output chamber of the first receptacle to the second receptacle.

12. A system, comprising: a first receptacle adapted to receive a welding electrode tip for disposal from an electrode tip changing unit; and a second receptacle adapted to receive the welding electrode tip from the first receptacle, wherein the second receptacle and the first receptacle are operatively connected via a connecting mechanism, the connecting mechanism comprising a route configured to permit a propellant to move the welding electrode tip from the first receptacle to the second receptacle.

* * * * *